(12) United States Patent
Qiu et al.

(10) Patent No.: US 8,387,011 B2
(45) Date of Patent: Feb. 26, 2013

(54) METHOD AND APPARATUS FOR A DYNAMIC AND REAL-TIME CONFIGURABLE SOFTWARE ARCHITECTURE FOR MANUFACTURING PERSONALIZATION

(75) Inventors: Xin Qiu, San Diego, CA (US); Liqiang Chen, San Diego, CA (US); Fan Wang, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1579 days.

(21) Appl. No.: 11/831,347

(22) Filed: Jul. 31, 2007

(65) Prior Publication Data
US 2009/0037931 A1   Feb. 5, 2009

(51) Int. Cl.
G06F 9/44 (2006.01)
G06F 15/173 (2006.01)

(52) U.S. Cl. .................. 717/121; 717/168; 709/223
(58) Field of Classification Search .................. None
See application file for complete search history.

(56) References Cited

U.S. PATENT DOCUMENTS

| | | | |
|---|---|---|---|
| 6,560,604 B1 * | 5/2003 | Fascenda | 1/1 |
| 6,934,933 B2 * | 8/2005 | Wilkinson et al. | 717/121 |
| 7,546,361 B2 * | 6/2009 | Zalzalah et al. | 709/223 |
| 7,606,888 B2 * | 10/2009 | Tanner et al. | 709/223 |
| 7,797,679 B2 * | 9/2010 | Tysowski et al. | 717/121 |
| 7,941,786 B2 * | 5/2011 | Scott et al. | 717/121 |
| 2004/0210653 A1 * | 10/2004 | Kanoor et al. | 709/223 |
| 2004/0243994 A1 * | 12/2004 | Nasu | 717/171 |
| 2005/0257209 A1 * | 11/2005 | Adams et al. | 717/168 |
| 2005/0289527 A1 * | 12/2005 | Illowsky et al. | 717/148 |
| 2006/0200814 A1 * | 9/2006 | Kontinen et al. | 717/168 |
| 2007/0169093 A1 * | 7/2007 | Logan et al. | 717/168 |
| 2008/0263543 A1 * | 10/2008 | Ramachandran | 717/177 |

FOREIGN PATENT DOCUMENTS
WO   2006/062695 A2   6/2006

OTHER PUBLICATIONS

Rao et al. iMobile: A Proxy-based Platform for Mobile Services, Proceedings of the first workshop on Wireless mobile internet, 2001, pp. 3-10, Retrieved on [Nov. 15, 2012] Retrieved from the Internet: URL<http://dl.acm.org/citation.cfm?id=381483>.*
Park et al. An Automated WSDL Generation and Enhanced SOAP Message Processing System for Mobile Web Services, Third International Conference on InformationTechnology, Apr. 2006, Retrieved on [Nov. 15, 2012] Retrieved from the Internet: URL<http://ieeexplore.ieee.org/stamp/stamp.jsp?tp=& arnumber=1611623>.*
PCT Search Report and Written Opinion; PCT International Searching Authority (Issued Oct. 2, 2008).

* cited by examiner

*Primary Examiner* — Thuy Dao
*Assistant Examiner* — Cheneca Smith
(74) *Attorney, Agent, or Firm* — Thomas A. Ward

(57) ABSTRACT

A process receives a personalization request to personalize a communication device. Further, the process provides the personalization request to a message controller that composes a message having personalization information with a message composer engine according to a set of rules and configures one or more communication parameters for the message with a message flow control engine according to the set of rules. The set of rules indicates a distributed environment set of files that the message composer engine and the message flow control engine utilize in a distributed environment, and a centralized environment set of files that the message composer engine and the message flow control engine utilize in a centralized environment.

14 Claims, 11 Drawing Sheets

METHOD AND APPARATUS FOR A DYNAMIC AND REAL-TIME CONFIGURABLE SOFTWARE ARCHITECTURE FOR MANUFACTURING PERSONALIZATION

BACKGROUND

1. Field

This disclosure generally relates to the configuration of a device. More particularly, the disclosure relates to the personalization of a device.

2. General Background

A variety of manufacturing processes and message protocols are currently utilized to personalize, i.e., make unique, communication devices such mobile devices, set top boxes, cable modems, and the like. These manufacturing processes and message protocols are generally distinct from one another, yet share certain similarities. During the personalization process, a plurality of devices may share some messages. These messages may be core technology based specific security personalization data messages that are specific to some products and/or common manufacturing test messages that are utilized to verify that the device is operating correctly utilizing the personalization data that has been loaded.

However, differences among the various devices, which share the messages, may cause divergences and discrepancies in the personalization process. For instance, one device may have a different product/factory configuration from another. As a result, one device may utilize one set of protocols and message layers while another device utilizes a different set of protocols and message layers. Further, a hardware component of one device may need to be personalized while a hardware component of another device may not need to be personalized. As an example, one device may only need an embedded security chip to be personalized while another device may need both an embedded host module and an embedded security chip to be personalized. In addition, one device may utilize a different message path than another device. As an example, a RS232/fiber serial link may be utilized by one device while a modem may be utilized by another device. As a result, different message retransmission mechanisms may be utilized for different message paths and error conditions. Finally, one device may utilize a different security mechanism than another device because different security chips may be used. For instance, one device may utilize an encryption key and an authentication key having a first size while another device utilizes an encryption key and an authentication key having a second size that is smaller than the first size. Further, the encryption algorithm utilized by one device may be different than the encryption algorithm utilized by another device.

Software applications have been developed in an attempt to address these divergences and discrepancies. However, the development of additional software applications created new problems. For instance, the development time for adding a new software functionality to the existing code to address the divergences and discrepancies would normally take an additional amount of time. This additional time is often too significant for devices that need to be launched quickly. Further, validation/test code is needed for the software application. The validation/test code is separate from the software application and, thereby, involves additional time to the time needed to develop the software application. The validation/test code is utilized for both product verification and as a stress test tool in the laboratory to avoid the need of utilizing real devices for regression testing of the main application code. Further, any feature enhancement and bug fix needs to be duplicated in different applications and retested. In addition, any change in manufacturing related parameters and configurations requires a code change. The code change may lead to a separate software update and deployment in the field that would require the time and resources to complete the task. Further, the separate software update and deployment may carry the possibility of new bugs and/or errors that could disrupt the production process.

SUMMARY

In one aspect of the disclosure, a process may be utilized to personalize a communication device. The process receives a personalization request to personalize a communication device. Further, the process provides the personalization request to a message controller that composes a message having personalization information with a message composer engine ("MCE") according to a set of rules and configures one or more communication parameters for the message with a message flow control engine ("MFCE") according to the set of rules. The set of rules indicates a distributed environment set of files that the MCE and the MFCE utilize in a distributed environment, and a centralized environment set of files that the MCE and the MFCE utilize in a centralized environment. In addition, the process processes the message with a message handler according to a configuration of personalization software for the communication device and based on whether the configuration of personalization software for the communication device is included in a distributed environment or a centralized environment.

In yet another aspect, a process may be utilized to personalize a communication device. The process receives a first personalization request to personalize a first communication device and a second personalization request to personalize a second communication device. The second communication device is distinct from the first communication device. Further, the process provides the first personalization request and the second personalization request to a message controller that composes a first message having personalization information specific to the first communication device and a second message having personalization information specific to the second communication device with an MCE, and configures one or more communication parameters specific to the first communication device for the first message and one or more communication parameters specific to the second device for the second message with an MFCE. Finally, the process processes the message with a message handler according to a configuration of personalization software for the communication device.

In yet another aspect, a process may be utilized to personalize a communication device. The process receives a first personalization request to personalize a first communication device and a second personalization request to personalize a second communication device. The second communication device is distinct from the first communication device. Further, the process provides the first personalization request and the second personalization request to a message controller that simultaneously in real-time composes a first message having personalization information specific to the first communication device and a second message having personalization information specific to the second communication device with an MCE, and configures one or more communication parameters specific to the first communication device for the first message and one or more communication parameters specific to the second device for the second message with an MFCE. Finally, the process processes the message with a message handler according to a configuration of personalization software for the communication device.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A method and apparatus are disclosed, which provide a dynamic and real-time configurable software architecture for manufacturing personalization. Layered message interface/components are defined. These layered message/interface components are based on a configuration of modules specified by the manufacturing process for a device. The dynamic and real-time configurable software architecture allows personalization software to be operated dynamically under different product/factory configurations utilizing different message protocols/message layers, security mechanisms, and message paths as well as different retransmission mechanisms. The dynamic and real-time configurable software architecture also allows different products to be personalized simultaneously in real-time based on the initial personalization requests. The dynamic and real-time configurable software architecture is easily adopted for a new product variation, which thereby reduces development and testing time. Further, the dynamic and real-time configurable software architecture allows the personalization application to be configured to run as a server, which contains all the personalization data for a device, or as a client, which interfaces with the server and passes personalization data to the target device.

Figure 1:
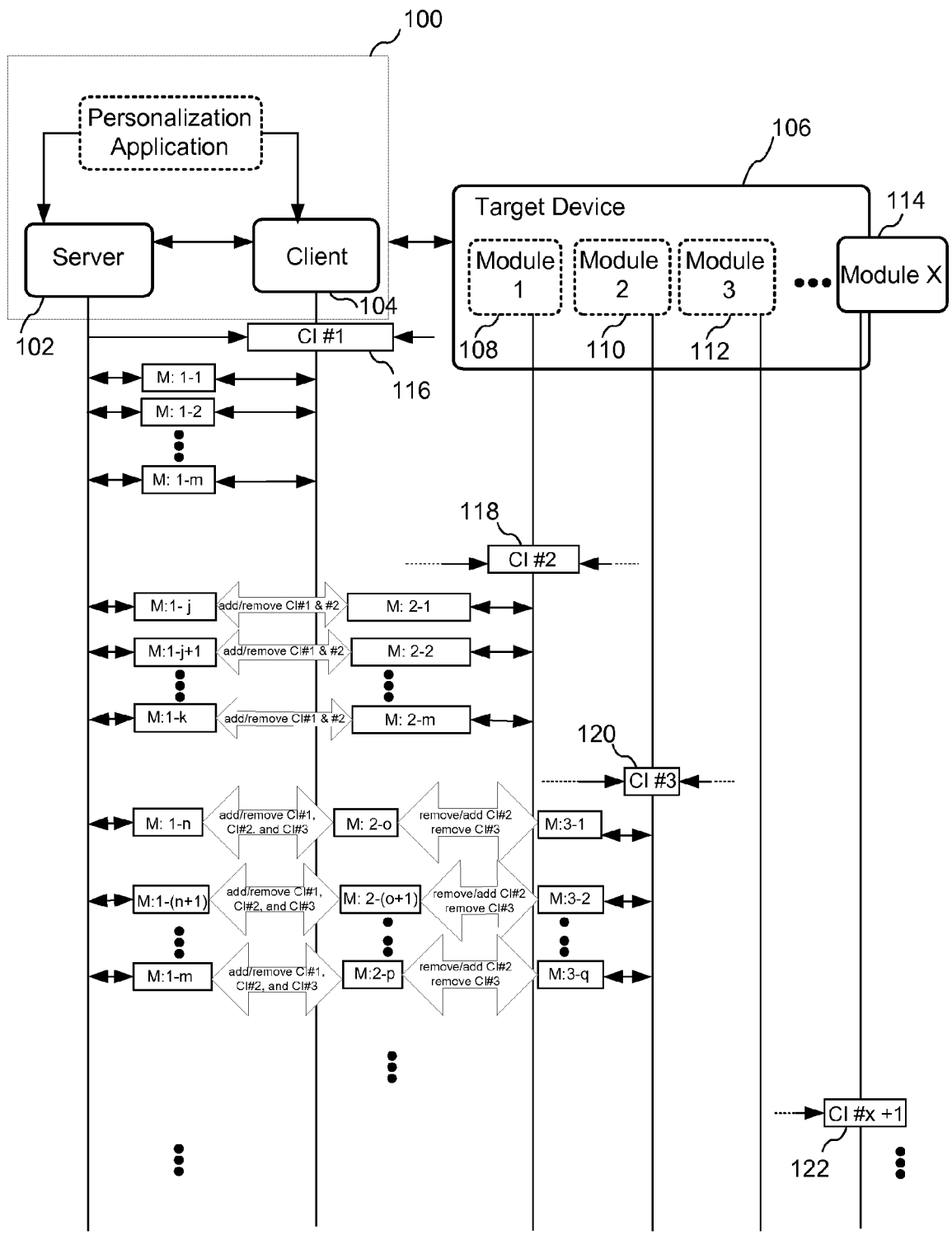
FIG. 1 illustrates the definition of layered message interfaces/components for a manufacturing configuration of a target device.

FIG. 1 illustrates a personalization software configuration 100 that is utilized for personalization in an engineering development environment and the messaging interface utilized by the personalization software configuration 100. The personalization software configuration 100 has a configuration of layered message interfaces and components. For new products, the personalization process of a prototype/test device will be developed first in an engineering/product development environment before being integrated into the manufacture process at a factory. The personalization software configuration 100 in this environment allows a personalization application, which is a software application, to be configured and operated either as a Server 102 or a Client 104.

In one configuration, shown in FIG. 1, the server 102 is located in a trusted lab while the client 104 may be distributed to different product development teams/labs to connect a Unit Under Test ("UUT"), which is a device that needs to be personalized, to the server 102. During the development of the personalization process, different product teams need the client 104 to be configurable so they have control over different layers of the protocol messages. Accordingly, in this case, the server 102 just builds the core "personalization" message content (often with the security data related to a specific security component/chip in a device) with a first communication interface ("CI"), and leaves the rest of the message definition/construction to the client 104, which can be configured by different engineering groups. In other words, the client 104 has the flexibility to be configured in real time to interface with both the server 102 and the target device 106. Accordingly, the message layers can be constructed for different CIs by users for a particular product. After the development, the definitions of the messages created by the server and client will be combined into a XML-based configuration file that will be used by manufacturing process for the personalization of a product. In another engineering configuration, both the server 102 and the client 104 are located in the trusted lab. The client 104 is configured to simulate a device and to perform a stress test of the server 102. In this case, the server 102 may simply build entire message for different modules of the device. Accordingly, the personalization software configuration 100 allows the client 104 and the server 102 to be configured differently to accommodate both configurations.

A plurality of CIs may be utilized to transmit messages between the different components through the messaging interface. For instance, a CI may be utilized for each of the modules in the target device 106 to communicate with the personalization application, which is configured and operated as the server 102 or the client 104. The first CI 116 is utilized to communicate a first plurality of messages between the server 102 and the client 104. Each message is denoted by "M". Further, the first plurality of messages that conforms to the first CI 116 is denoted as "M:1". Each message in the first plurality of messages is further denoted by "M:1-message number". For instance, a first message in the first plurality of messages is denoted by "M:1-1". The first plurality of messages may include data for initialization, configuration, etc. of the server 102 and/or the client 104 for personalization.

Further, the second CI 118 is utilized to communicate a plurality of messages to the first module 108 of the target device 106 from either the client 104 or the second module 110. The server 102 first builds core personalization messages only with the first CI 116. The client 104 removes/adds the first CI 116 to recover the core personalization messages for the client 104/the server 102. For instance, the client 104 may receive the first plurality of messages M:1 with embedded core personalization messages from the server 102 with the first CI 116. The client 104 first removes the first CI 116, and then recovers the core personalization messages. The client 104 then builds messages M:2 with the second CI 118, and forwards M:2 to the first module 1 108 in the target device 106. In the personalization response messages from the first module 108 to the server 102, the client 104 needs to remove the second CI 118. The client 104 hen adds the first CI 114 based on the protocol for the first CI 116, and forwards M:1-j, . . . , M:1-k to the server 102.

In addition, the third CI 120 is utilized to communicate a plurality of messages to the second module 110 of the target device 106 either from the first module 108 or from a third module 112. The client 104 removes/adds the first CI 116 to recover the core personalization messages for the client 104/the server 102. In addition, the client 104 adds/removes other CIs, e.g., the second CI 118 and/or the third CI 120, to construct messages for other modules as well as the server 102. For instance, the client 104 may receive a plurality of messages M:1 from the server 102 with only the first CI 116 included. The client 104 may first remove the first CI 116 and recover the core personalization messages, based on the protocol for the first CI 116. Then the Client 104 adds both the second CI 118 and the third CI 120 with the third CI 120 embedded in the inner message layer, and the second CI 118 embedded in the outer message layer to form M:2. The M:2 messages are forwarded to the first module 108. Accordingly, the M:2 message sent from the client 104 to the first module 108 conforms to the second CI 116. The first module 108 in turns removes the second CI 118, and recovers the message M:3-1 . . . M:3-r, based on the protocol for the third CI 120, and forwards the message to the second module 110. However, in the response messages from the second module 110 to the server 102, each module as well as the client 104 needs to implement reversed message interface conversion. This approach may be utilized through the module x 114, which utilizes the x+1 CI 122.

In addition, each module as well as client 104 shown in the above configuration can act as a pass through component that does not modify the messages.

After completing the engineering development of personalization process, message definitions/interfaces used by both the server 102 and the client 104 may be combined and packaged to be used in the manufacturing personalization process for each product.

Figure 2:
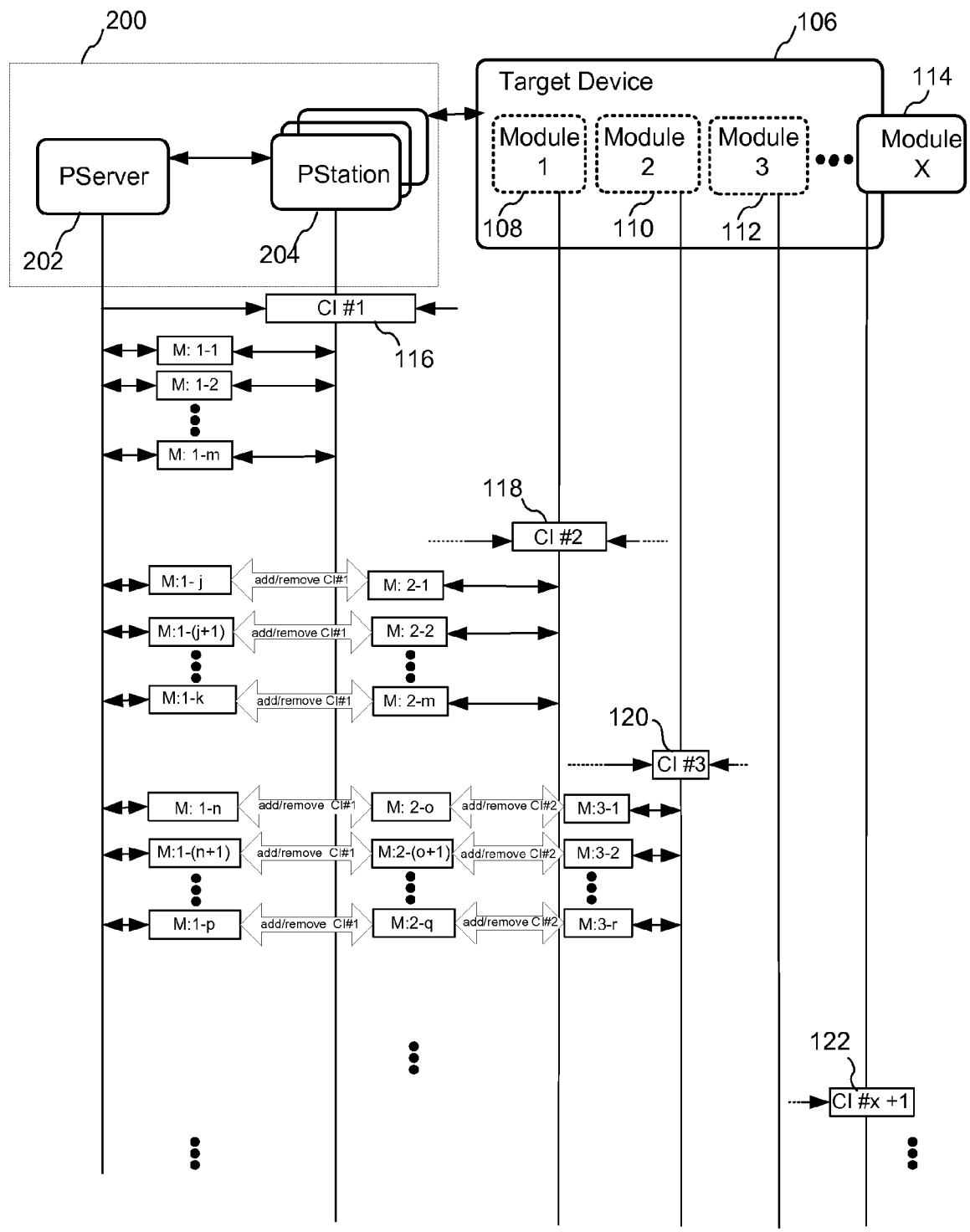
FIG. 2 illustrates a personalization software architecture that is utilized for personalization in an engineering development environment.

FIG. 2 illustrates the definition of layered message interfaces/components for a manufacturing configuration 200 of a target device 106. In a manufacturing process, the target device is connected to a personalization station ("PStation") 204 first, which is normally developed by a manufacturing team. The PStation 204, with the knowledge of which device is to be personalized, will generate the initial personalization request, and send it to a personalization server ("PServer") 202. In this configuration, the PServer 202 is expected to build the personalization messages that may be directly forwarded to the modules in the target device 106 that need to be personalized without or with very little modification, based on a configuration file generated by the engineering development process. As discussed above regarding FIG. 1, the message layers and CIs used by both the server 102 and the client 104 in the engineering personalization configuration will be combined and packaged for the manufacturing personalization process for a particular product.

In one embodiment, a plurality of PStations 204, each having different configurations and software to generate different personalization requests for different products, may be utilized. The different software may result from different manufacturing engineering teams developing the different PStations 204. The target device 106 may include a plurality of modules. For instance, the target device/product 106 may include a first module 108, a second module 110, a third module 112, . . . , a module x 114. The first module 108, the second module 110, and the third module 112 are contained in the target device 106 where as the module x 114 is contained in the target device and an additional target device. In other words, the module x 114 is shared amongst target devices.

A plurality of CIs may be utilized to transmit messages between the different components of the manufacturing configuration or a product in a similar manner as the engineering configuration seen in FIG. 1. For instance, a CI may be utilized by each of the modules in the target device 106 to communicate with other modules as well as the PStation 204 and the PServer 202 in the manufacturing configuration 200. A first CI 116 is utilized to communicate a first plurality of messages between the PStation 204 and the PServer 202. Each message is denoted by "M". Further, the first plurality of messages for the first CI 116 is denoted as "M:1". Each message in the first plurality of messages is further by "M:1-message number". For instance, a first message in the first plurality of messages is denoted by "M:1-1". The first plurality of messages may include data for initialization, configuration, etc. of the PStation 104 for personalization.

Further, the second CI 118 is utilized to communicate a plurality of messages to the first module 108 of the target device 106 from either the PStation 204 or the second module 110. As discussed above, the PServer 202 is expected to build the messages with different layers that conform to the first CI 116, the second CI 118, the third CE 120, etc. The PStation 204 removes/adds the first CI 116 to recover correct personalization messages for the PStation 204/the PServer 202. For instance, the PStation 204 may receive the first plurality of messages M:1 with embedded personalization messages from the PServer 202 with the first CI 116 present at the most outer message layer. The PStation 204 first removes the first CI 116, and then recovers the personalization messages with the second CI 116 present at the most outer layer of the message to form M:2, and forwards M:2 to the first module 108 in the target device 106. In the response messages from the first module 108 to the PServer 202, the PStation 204 receives the message from the first module 108 first. Subsequently, the PStation 204 adds the first CI 116 based on the protocol for the first CI 114. The PStation 204 then transmits M:1-j, . . . , M:1-k to the PServer 202.

In addition, the third CI 120 is utilized to communicate a plurality of messages to the second module 110 of the target device 106 either from the first module 108 or from the third module 112. The PStation 204 removes/adds the first CI 116 to recover correct personalization messages for the PStation 204/the PServer 202. The first module 108 removes/adds the second CI 118 to recover correct personalization messages for the second module 110/the PStation 204. For instance, the PStation 204 may receive the first plurality of messages M:1 from the PServer 202 with all message CIs included, but with the first CI 116 present in the outer most message layer. The PStation 204 may first remove the first CI 116 and recover the message, based on the protocol for the first CI 116. The PStation 204 then forwards the rest of messages that are already correctly formatted by PServer 202 for the second CI 118 and the third CI 120 to the first module 108. Accordingly, the message sent from the PStation 204 to the first module 108 conforms to the second CI 118. The first module 108 in turns removes the second CI 118, and recovers the message M:3-1 . . . M:3-r, based on the protocol for the third CI 120, and forwards it to the second module 110. However, in the response messages from the second module 110 to the PServer 202, each module as well as the PStation 204 implements reversed message interface conversion. This approach may be utilized through the module x 114, which utilizes the x+1 CI 122.

Accordingly, the target device 106 may have modules ranging from the first module 108 through the module x 114.

Each of these modules may have a corresponding CI. For instance, the first module 108 utilizes the second CI 118, the second module 110 utilizes the third CI 120, and the module x 114 utilizes the x+1 CI 122.

In addition, each module as well as the PStation 204 shown in the above configuration can act as a pass-through component that does not modify any messages.

Figure 3:
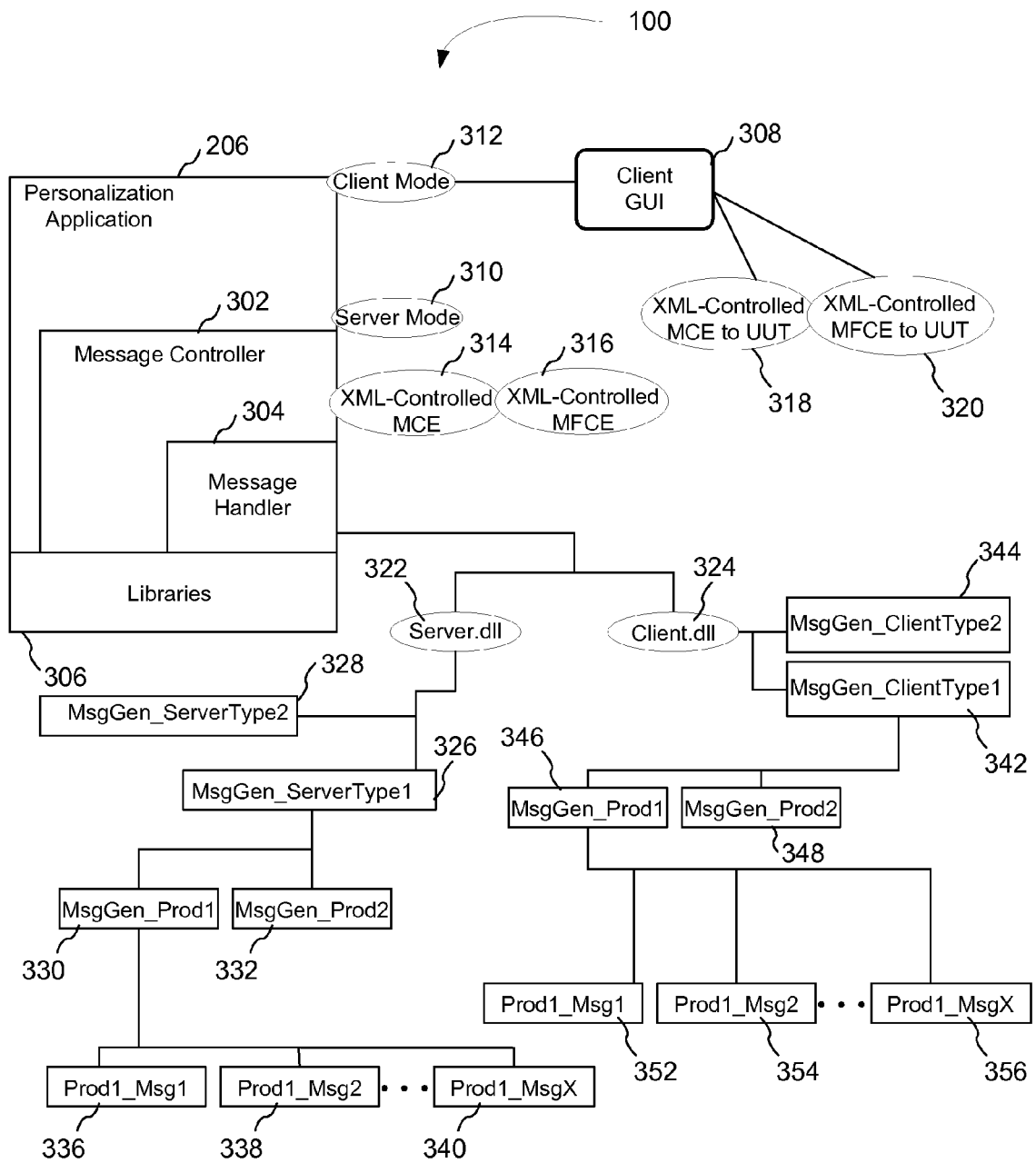
FIG. 3 illustrates an expanded view of the personalization software architecture illustrated in FIG. 1.

FIG. 3 illustrates an expanded view of the personalization software configuration 100 illustrated in FIG. 1. The personalization application 106 includes a message controller 302, a message handler 304, and one or more libraries 306. The message controller 302 includes an XML-Controlled MCE 314 and an XML-Controlled MFCE 316, the message hander includes a dynamically linked library ("dll") for the client and/or a dll for the server, the one or more libraries 306 may include communication libraries, encryption/authentication libraries, etc. Further, the personalization application interacts with a graphical user interface ("GUI") of the client 104 (shown in FIG. 1).

The personalization software configuration 100 allows the personalization application to be operated in either a server mode 310 or a client mode 312. The directions of the message flows are different depending on whether the personalization application operates as the server 102 or the client 104 (shown in FIG. 1). If the client 104 is utilized to simulate a device in order to test the server code, the operations of the server 102 will be opposite to the operations of the client 104. For example, if the server 102 performs an encryption operation, the client 104 would then perform the corresponding decryption operation. Accordingly, the message handler 304 is implemented differently, depending on whether the personalization application is operating as the server 102 or the client 104. A server dynamically linked library ("dll") 310 and a client dll 312 are created. If both dlls are present, the personalization application may be configured to operate as the server 102 or the client 104.

In one embodiment, when the personalization software configuration 100 is utilized in the factory, the client dll 312 is removed so that only the server mode is available. Further, multiple engineering teams may perform personalization of test devices in engineering labs by utilizing the client mode 312. The personalization software configuration 100 provides the multiple engineering teams with the flexibility to test the server code/interface with different error conditions and interface messages according to a product specification. Therefore, the client GUI 308 may be utilized in the client mode for users to define to interface messages and create different error conditions as needed.

The message controller 302 is built by utilizing two message processing engines: an MCE 314 and an MFCE 316. The MCE 314 is utilized to form messages for specific devices based on information defined by one or more Extensible Markup Language ("XML") files. Different XML files (or a combined single XML file, but tagged differently) are utilized for different devices. A determination is made in real-time as to which XML file (or if a single XML file is used, which section of the XML file that is tagged for a specific device) will be utilized. The determination is made based on device information included in an initial personalization request generated by the client 104 (FIG. 1) or the PStation 204 (FIG. 2).

Figure 4:
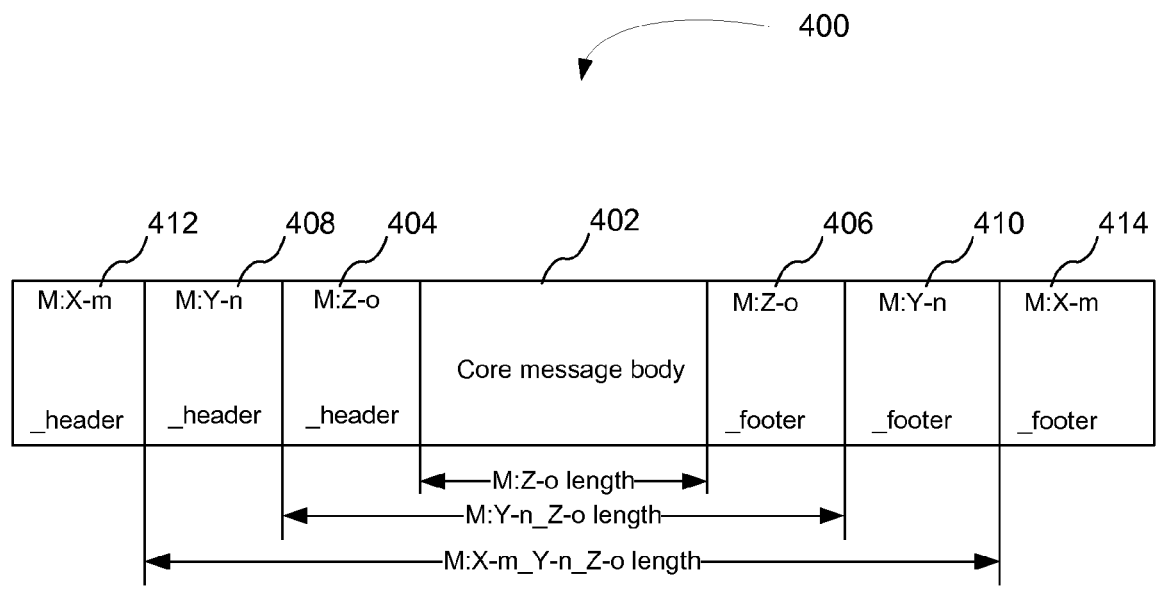
FIG. 4 illustrates a format of a message composed by the MCE shown in FIG. 3 for a first product.

FIG. 4 illustrates a format of a message 400 composed by the MCE 314 shown in FIG. 3 for a first product. The following code is an example of an XML file that may be utilized to compose the message 400:

```
<?xml version="1.0" encoding="utf-8" ?>
<product name="Product1">
<! - Example #1: an example of a generic message composition below" -- >
......
<msg name="Product1_Msg_C"
M:X-m_header="type_byte,type_specific_bytes
(type dependant, variable length), M:X-m_Yn_Z-o_length"
M:Y-n_header="type_byte, type_specific_bytes (type
dependent, variable length), M:Y-nZ-o_length"
M:Zo_header="type_byte, type_specific_bytes (type dependant,
variable length), M:Z-o_length"
M:Z-o_footer (optional)="footer bytes specific to
M:_Z-o" M:Y-n_footer (optional) ="footer bytes specific to M:Y-n"
M:X-m_footer (optional) ="footer bytes specific to M:X-m"/>
<! -- "Product1_Msg_C": means Msg # C in the personalization process
for product 1 -- >
<!-- X, Y, Z: index to "communication interface" X, Y, and Z-->
<! - M:X_m: message # m that is specific to "communication
interface" X-->
<! -- _footer: is optional for "communication interfaces". -->
```

The message 400 is a generic message that includes a M::Z-o message body 402. Further, a M:Z-o header 404 and a M:Z-o footer 406 are included. In one embodiment, a header and a footer are part of metadata that indicates a message protocol specific to a communication interface for a specific module in the communication device. In addition, a M:Y-n 408 header and a M:Y-n footer 410 for the message M:Y-n_Z-o are also in the message 400. Further, a M:X-m header 412 and a M:X-m footer 414 for the message M:X-m_Y-n_Z-o are also in the message.

Figure 5:
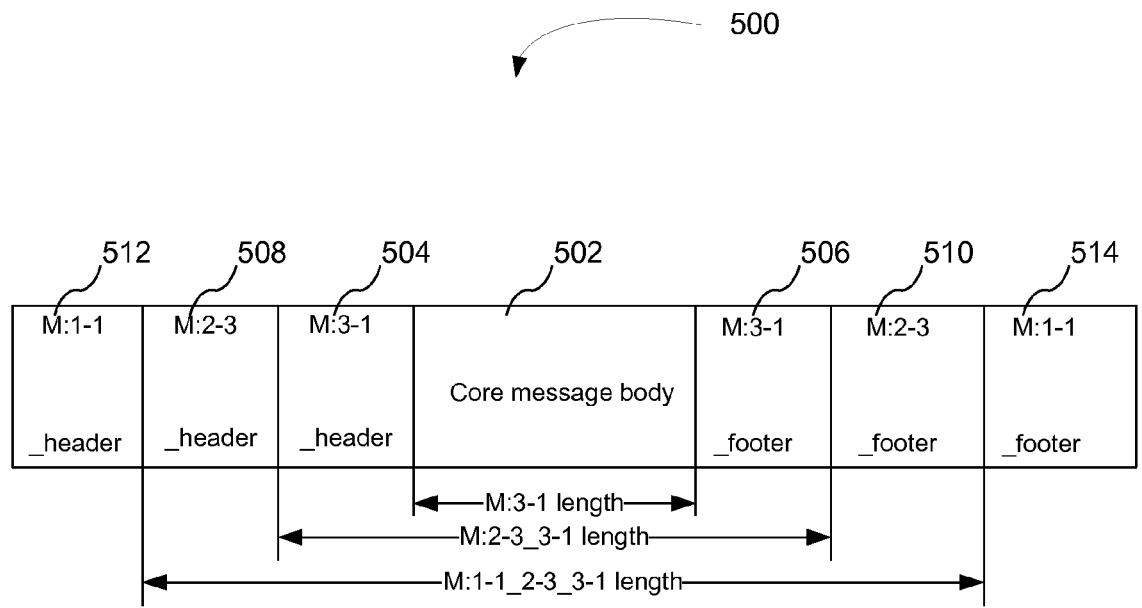
FIG. 5 illustrates a specific message composed by the MCE shown in FIG. 3 for a second product.

FIG. 5 illustrates a specific message 500 composed by the MCE 314 shown in FIG. 3 for a second product. The following code is an example of an XML file that may be utilized to compose the message 500:

```
<product name="Product2">
<! -- Example #2: an example of a specific message composition below" -- >
......
<msg name="Product2_Msg_1"
M:1-1_header="type_byte, type_specific_bytes
(type dependant, variable length), M:1-
1_2-3_3-1_length"
M:2-3_header="type_byte, type_specific_bytes
(type dependant, variable length), M:2-
3_3-1_length"
M:3-1_header="type_byte, type_specific_bytes
(type dependant, variable
length), M:3-1_length"
M:3-1_footer="footer bytes specific to
M:3-1" M:2-3_footer="footer bytes specific to M:2-3"
M:1-1_footer="footer bytes specific to M:1-1"/>
<! -- "Product2_Msg_1": means Message 1 in the personalization process
for product 2 -- >
<! -- M:1-1_header (or footer), M:2-3_header (or footer) and M:3-
1_header (or footer): headers (or footers) for message #1 specific to
communication interface 1 (M:1-1), message #3 specific to communication
interface 2 (M:2-3), and message #1 specific to communication interface 3
(M:1-3) -->
<! -- M:1-1: message #1 that is specific to "communication
interface 1" -->
<! -- M:2-3: message #3 that is specific to "communication
interface 2" -->
<! -- M:3-1: message #1 that is specific to "communication
interface 3" -->
......
```

The message 500 is a specific message composition for the second product and includes core message body 502. Further, a M:3-1 header 504 and a M:3-1 footer 506 are included. In addition, the M:2-3 header 508 and the M:2-3 footer 510 for the message M:2-3__3-1 are also in the message 500. Further, the M:1-1 header 512 and the M:1-1 footer 514 for the message M:3-1__2-3__3-1 are also in the message.

Figure 6:
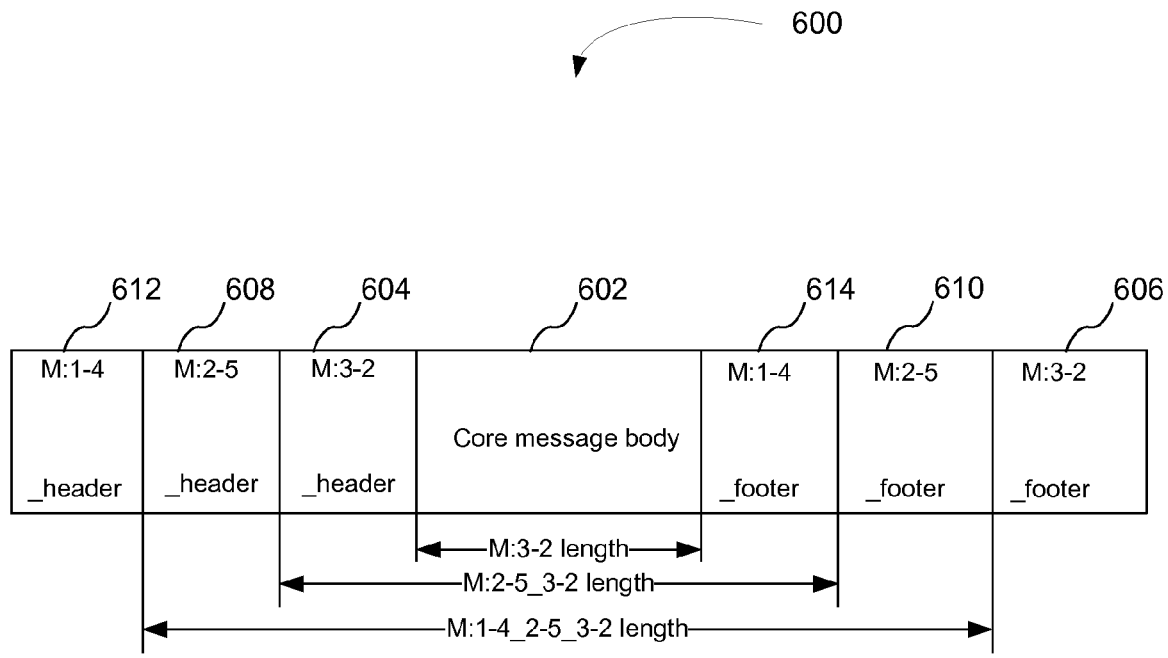
FIG. 6 illustrates a specific message composed by the MCE shown in FIG. 3 for a third product.

FIG. 6 illustrates a specific message 600 composed by the MCE 314 shown in FIG. 3 for a third product. The following code is an example of an XML file that may be utilized to compose the message 600:

```
<product name="Product3">
<! -- Example #3: a example of specific message composition below" -- >
......
<msg name="Product2_Msg_3"
M:1-2_header="type_byte, type_specific_bytes
(type dependant, variable length), M:1-4__2-5__3-2__length"
M:2-5_header="type_byte, type_specific_bytes
(type dependant, variable length), M:2-5__3-2__length"
M:3-2_header="type_byte, type_specific_bytes (type dependant,
variable length), M:3-2__length"
M:3-2_footer="footer bytes specific to
M:3-2" M:2-5_footer="footer bytes specific to M:2-5"
M:1-4_footer="footer bytes specific to M:1-4"/>
<! -- "Product2_M:_1": means Message 1 in the personalization process
for product 2 -- >
<!-- M:1-4_header (or footer), M:2-5_header (or footer) and M:3-
2_header (or footer): headers (or footers) for message #4 specific to
communication interface 1 (M:1-4), message #5 specific to communication
interface 2 (M:2-5), and message #2 specific to communication interface 3
(M:1-3) -->
<! -- M:1-4: message #4 that is specific to "communication
interface 1" -->
<! -- M:2-5: message #5 that is specific to "communication
interface 2" -->
<! -- M:3-2: message #2 that is specific to "communication
interface 3" -->
......
```

The message 600 is a specific message composition for the third product and includes a M:3-2 message body 602. Further, a M:3-2 header 604 and a M:3-2 footer 606 are included. In addition, a M:2-5 header 608 and a M:2-5 footer 610 for the message M:2-5__3-2 are also in the message 600. Further, a M:1-4 header 612 and a M:1-4 footer 614 for the message M:1-4__2-5__3-2 are also in the message.600.

With respect to FIG. 3, the MFCE 316 is also defined by one or more XML files. The MFCE 316 is utilized to configure one or more communication parameters such as message path, message directions, message transmission speed, message processing time/delay, and a message error handling mechanism that determines error message handling work flow, i.e., when an error occurs, etc. In one embodiment, the error cases may include an invalid message format and a valid message format, but with a specific error status in the message. When an error is detected for the invalid message format, a message or multiple messages will be resent because of possible data corruption during the transmission. When an error is detected in the valid message format, but with a specific error status in the message, a final termination message will be send because the error is not recoverable.

An example of the MFCE 316 XML file is provided below:

```
<?xml version="1.0" encoding="utf-8" ?>
<product name="ProductX">
<! - define default message flow control parameters -- >
< port_number ="2000" default_SSL ="Yes"
msg_default_path ="Ethernet" timeout_default="4000" >
<! -- Example: an example of a specific message flow control engine" -- >
<msg name="ProductX_Msg 1" io="I" />
<! -- io="I" : means "productX_Msg_1" is an input message to
the server -->
```

-continued

```
<msg name="ProductX_Msg 2" io="O" />
<! -- io="I" : means "productX_Msg_2" is an output message to
the server -->
<msg name="ProductX_Msg 3" io="I" additional_timeout ="60000"
/>
<! -- "delay" = "60000" : means that a 60-second delay is added to the
default timeout value since it may take more time for the product to send
back "ProductX_Msg 3" message -- >
<msg name="ProductX_Msg 4" io="O" msg_path = "serial"
baud_rate ="192000"/>
<msg name=" ProductX_Msg 5" io="I" rptMsg=" ProductX_Msg 4"
rptNum="2" />
<! -- rptMsg=" ProductX_Msg 4" rptNum="3": means that if the server
receives an incorrectly formatted reply message, it will retransmit the
previous message "ProductX_Msg 4" up to three additional times -- >
<msg name=" ProductX_Msg 6" io="O" />
</seedload>
```

In a testing configuration, the direction of the message flows in the server mode 310 is opposite to the direction of the message flows in the client mode 312. Accordingly, an input message to the server 102 (shown in FIG. 1) will be an output message to the client 104 (shown in FIG. 1). In one embodiment, for consistency purposes, the same MFCE 316 file may be utilized both in the server mode 310 and the client mode 312. Further, the MFCE 316 may be defined from the perspective of the server 102, e.g., the input or the output. In addition, the MFCE 316 file may be defined from the perspective of the client 104. For consistency purposes, the same MCE 314 file may also be utilized both in the server mode 310 and the client mode 312. Further, the MCE 314 file may be defined from the perspective of the server 102, e.g., the input or the output. In addition, the MCE 314 file may be defined from the perspective of the client 104.

In one embodiment, the MCE 314 may be utilized in conjunction with the MFCE 316 according to a set of rules. For instance, rules may exist for an input message. If a specific header/footer for a communication interface is included in the MCE 314 file, then the input message is expected to have that header/footer. However, when the message is sent out, the header/footer is removed. If a specific header/footer for a communication interface is not included the MCE 314 file, then the input message is sent out directly. In addition, rules may exist for an output message. If a specific header/footer for a communication interface is included in the MCE 314 file, then the header/footer should be added to the message before the message is sent out. However, if a specific header/footer for a communication interface is not included in the MCE 314 file, then the message is sent out directly without adding any header/footer.

The MCE 314 and the MFCE 316 may be utilized together according to various configurations. For the configuration utilized in the factory, the personalization application runs in the server mode 310. Accordingly, all the messages will be composed and controlled by the server 102 so that only set of MCE 314 and MFCE 316 files defined from the perspective of the server are utilized. For the configuration utilized for engineering development, in addition to the server 102, the client 104 interfaces with the server 102 and the UUT at the same time, or simulates a UUT. For the case where the client 104 interfaces with the server 102, the client 104 utilizes a first set of MCE 314 and MFCE 316 files, which should match the MCE 314 and MFCE 316 files utilized by the server 102, when communicated with the server 102. In this case, the client 104 utilizes a second set of MCE 318 and MFCE 320 files to communicate with the UUT. For the case where the client 104 is utilized to simulate a UUT and communicate with the server 102 directly, only one set of MCE 314 and MFCE 316 files is utilized.

As discussed above, an engineering development environment may develop a simulator of an actual device, which may be utilized by a user through the client GUI 308 to verify the application of the server 102 before the actual device is made available in the lab. When the personalization application 206 is utilized for these purposes, the user is provided with the capability to define MCE XML files 318 and MFCE XML files 320 in order to specify which message to utilize and/or the message flow. Further, during the initial integration testing with different product development teams, the engineering environment may not have a loading station, which is normally developed by different factory engineering teams, to perform personalization in the Lab for product verification. Therefore, the personalization application 206 may be configured to act as the server 204 to generate personalization data or the client 104 to simulate a loading station. The personalization application 206 has the capability of simulating a device that generates messages with different error statuses. Accordingly, the personalization application 206 may be utilized by the user through the client GUI 308 as a stress test tool in the lab to eliminate the need for actual real devices for regression testing of the server code.

As discussed above, the server 102 and the client 104 usually conduct different operations and processes. For example, if the server 102 conducts an encryption, then the client 104 would conduct a decryption operation. Accordingly, different configurations are implemented for the server 102 and the client 104 for the different operations and processes, e.g., a configuration for the encryption operation in the server 102 and a configuration for the decryption operation in the client 104. Accordingly, a server.dll message handler 322 and a client.dll message handler 324 are created. Only one message handler 304 will be loaded to the application process space to make it either a server or a client.

In one embodiment, the server.dll message handler 322 has two types of message generators: MsgGen_ServerType1 326 and MsgGen_ServerType2 328. For ease of illustration, two message generators are provided as an example. However, more than two message generators may be utilized. The MsgGen_ServerType2 328 is a specific message generator, i.e., it generates messages that are specific to a single product. On the other hand, the MsgGen_ServerType1 326 is a common message generator, i.e., it generates messages that are utilized for a group of products. The methods defined in the MsgGen_ServerType1 326 may be passed on to a specific message generator through the inheritance property of Object Oriented Design ("OOD") programming. For instance, the methods defined in the MsgGen_ServerType1 326 may be passed on to the following specific message generators: MsgGen_Prod1 330 for a first product and MsgGen_Prod2 332 for a second product. Further, each of these specific message generators may generate a plurality of messages for the corresponding product. For instance, the MsgGen_Prod1 330 may generate a plurality of messages, i.e., Prod1_Msg1 336, Prod1_Msg2 338, . . . , Prod1_MsgX 340, for the first product.

Further, the client.dll message handler 324 has two types of message generators: MsgGen_ClientType1 342 and MsgGen_ClientType2 344. For ease of illustration, two message handlers are provided as an example. However, more than two message handlers may be utilized. The MsgGen_ClientType2 344 is a specific message generator. On the other hand, the MsgGen_ClientType1 342 is a common message generator. The methods defined in the MsgGen_ClientType1 342 may be passed on to a specific message generator through the inheritance property of OOD programming. For instance, the methods defined in the MsgGen_ClientType1 342 may be passed on to the following specific message generators: MsgGen_Prod1 346 for a first product and MsgGen_Prod2 348 for a second product. Further, each of these specific message generators may generate a plurality of messages for the corresponding product. For instance, the MsgGen_Prod1 346 may generate a plurality of messages, i.e., Prod1_Msg1 352, Prod1_Msg2 354, . . . , Prod1_MsgX 356, for the first product. In addition, the same message method name may be utilized for both the server 102 and the client 104, but they are implemented differently in the server.dll 322 and the client.dll 324.

The message processing methods defined in the message generator class will follow the following format:

```
public STATUS Method_Name (ref byte[ ] data)
{
// processing/operations below
......
......
return STATUS.SUCCESS;
}
```

The data holds the core message content, which is the most inner layer message body. For an input, the data is the portion of the message with all the headers and/or footers (if any) removed. An array is passed in and should have a size that is the length of the data it contains. For an output, the array holds the processed data ready to be added to the different headers/footers specified by each CI. The array size is created inside of the method and should have a size that is the length of the data it contains. Even though the same method name will appear in the Server.dll 322 and the Client.dll 324, the implementation will be different for the server 102 and the client 104.

The personalization application 302 also utilizes the one or more libraries 306. The one or more libraries 306 may include communication libraries that have a Transport Layer Security ("TLS") library, Ethernet library, Serial Communication library, and other communication libraries that are specific to products. The utilization of communication libraries is configured by XML file(s) for a specific product. Further, the one or more libraries 306 may include crypto libraries that have a Data Encryption Standard ("DES") library, Advanced Encryption Standard ("AES") library, Elliptical Curve Cryptography ("ECC") library, RSA® library, Hardware Secure Module ("HSM") library, etc. The key sizes and algorithm parameters may also be configured by XML files for a specific message and/or product. In addition, the one or more libraries 306 may include other libraries for other utilities.

Figure 7:
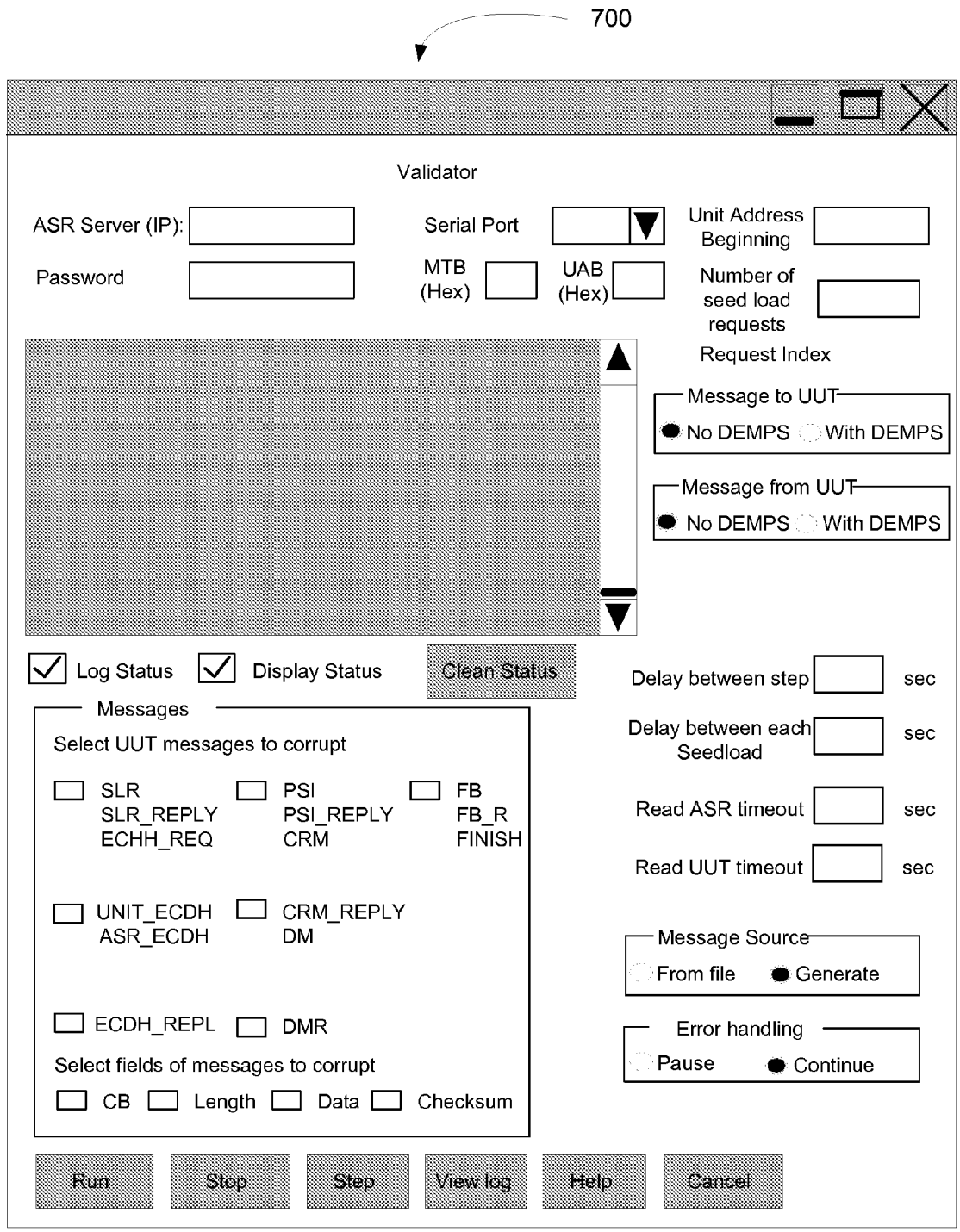
FIG. 7 illustrates a display that is an example of a display which receives a user input for defining the MCE XML files and MFCE XML files shown in FIG. 3.

FIG. 7 illustrates a display 700 that is an example of a display which receives a user input for defining the MCE XML files 318 and MFCE XML files 320 shown in FIG. 3. The display 700 allows the user to specify which message to utilize and/or the message flow. The display 700 allows the user to specify information to build the initial personalization request for a specific product. For instance, the user may specify the Message Type Byte ("MTB"), which is used to determine the message type related to a product that is used, the Unit Address Byte ("UAB"), which is defined to specify the type of the product, the beginning unit address of the units that need to be personalized, the number of seed load requests, which is equal to the number of units that need to be personalized, and the request index. The display 700 also allows the user to add Delphi External Messaging Protocol Specification ("DEMPS") headers and/or footers to the MCE XML file 318 utilized by the client to interface the UUT. DEMPS is one of the communication interfaces utilized by some of the set top boxes. Further, the display 700 allows the user to specify some parameters in the MFCE XML file 320 utilized by the client 104 (shown in FIG. 2) to interface with the UUT. For example, the delay between step, delay between each Seedload, read ASR timeout, and read UUT timeout are parameters that may be specified. For testing purposes, the display 700 also allows the user to specify which message to corrupt in order to test error handling and message retransmission mechanism. For example, a first message with corruption in the length field is a different message than a first message with corruption in the checksum field or the data field. Accordingly, a specific message with various error conditions may be considered as different basic messages, which may then be utilize by the MCE 314 to form different messages for specific CIs.

Figure 8:
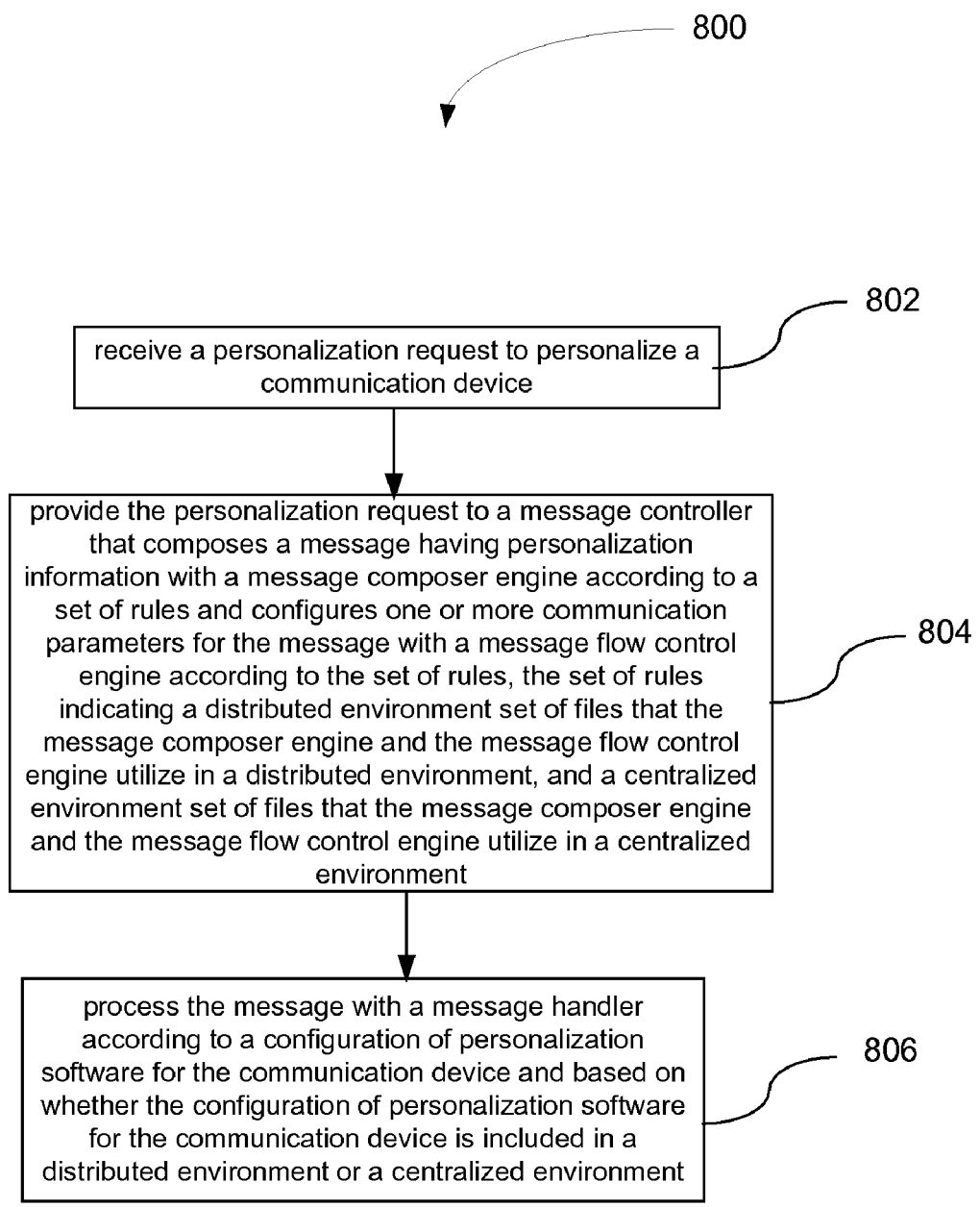
FIG. 8 illustrates a process that may be utilized to personalize a communication device.

FIG. 8 illustrates a process 800 that may be utilized to personalize a communication device. At a process block 802, the process 800 receives a personalization request to personalize a communication device. Further, at a process block 804, the process 800 provides the personalization request to a message controller that composes a message having personalization information with an MCE according to a set of rules and configures one or more communication parameters for the message with an MFCE according to the set of rules. The set of rules indicates a distributed environment set of files that the MCE and the MFCE utilize in a distributed environment, and a centralized environment set of files that the MCE and the MFCE utilize in a centralized environment. In addition, at a process block 806, the process 800 processes the message with a message handler according to a configuration of personalization software for the communication device and based on whether the configuration of personalization software for the communication device is included in a distributed environment or a centralized environment.

Figure 9:
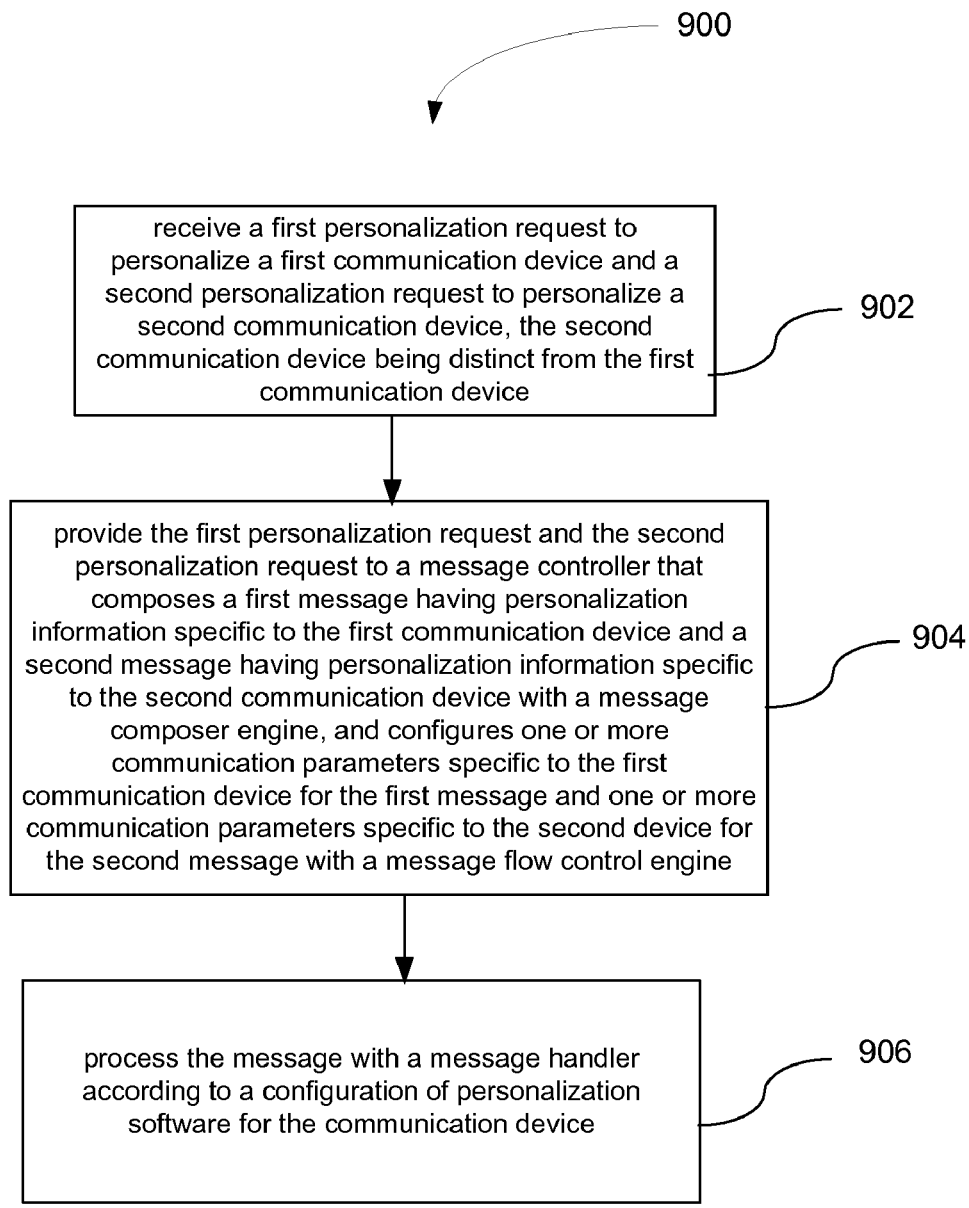
FIG. 9 illustrates another process that may be utilized to personalize a communication device.

FIG. 9 illustrates another process 900 that may be utilized to personalize a communication device. At a process block 902, the process 900 receives a first personalization request to personalize a first communication device and a second personalization request to personalize a second communication device. The second communication device is distinct from the first communication device. Further, at a process block 904, the process 900 provides the first personalization request and the second personalization request to a message controller that composes a first message having personalization information specific to the first communication device and a second message having personalization information specific to the second communication device with a MCE, and configures one or more communication parameters specific to the first communication device for the first message and one or more communication parameters specific to the second device for the second message with an MFCE. Finally, at a process block 906, the process 900 processes the message with a message handler according to a configuration of personalization software for the communication device.

Figure 10:
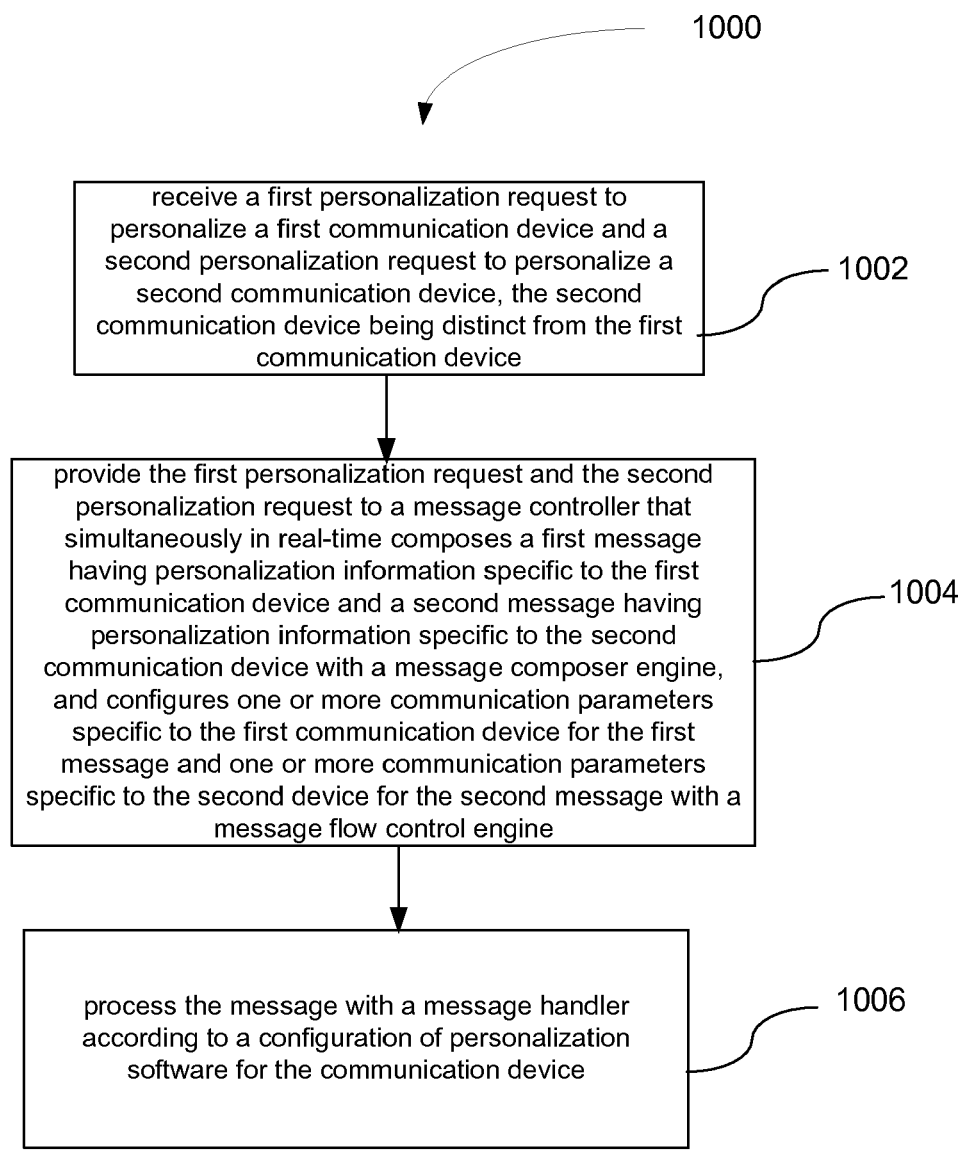
FIG. 10 illustrates yet another process that may be utilized to personalize a communication device.

FIG. 10 illustrates yet another process 1000 that may be utilized to personalize a communication device. At a process block 1002, the process 1000 receives a first personalization request to personalize a first communication device and a second personalization request to personalize a second communication device. The second communication device is distinct from the first communication device. Further, at a process block 1004, the process 1000 provides the first personalization request and the second personalization request to a message controller that simultaneously in real-time composes a first message having personalization information specific to the first communication device and a second message having personalization information specific to the second communication device with the MCE, and configures one or more communication parameters specific to the first communication device for the first message and one or more communication parameters specific to the second device for the second message with an MFCE. Finally, at a process block 1006, the process 1000 processes the message with a message handler according to a configuration of personalization software for the communication device.

Figure 11:
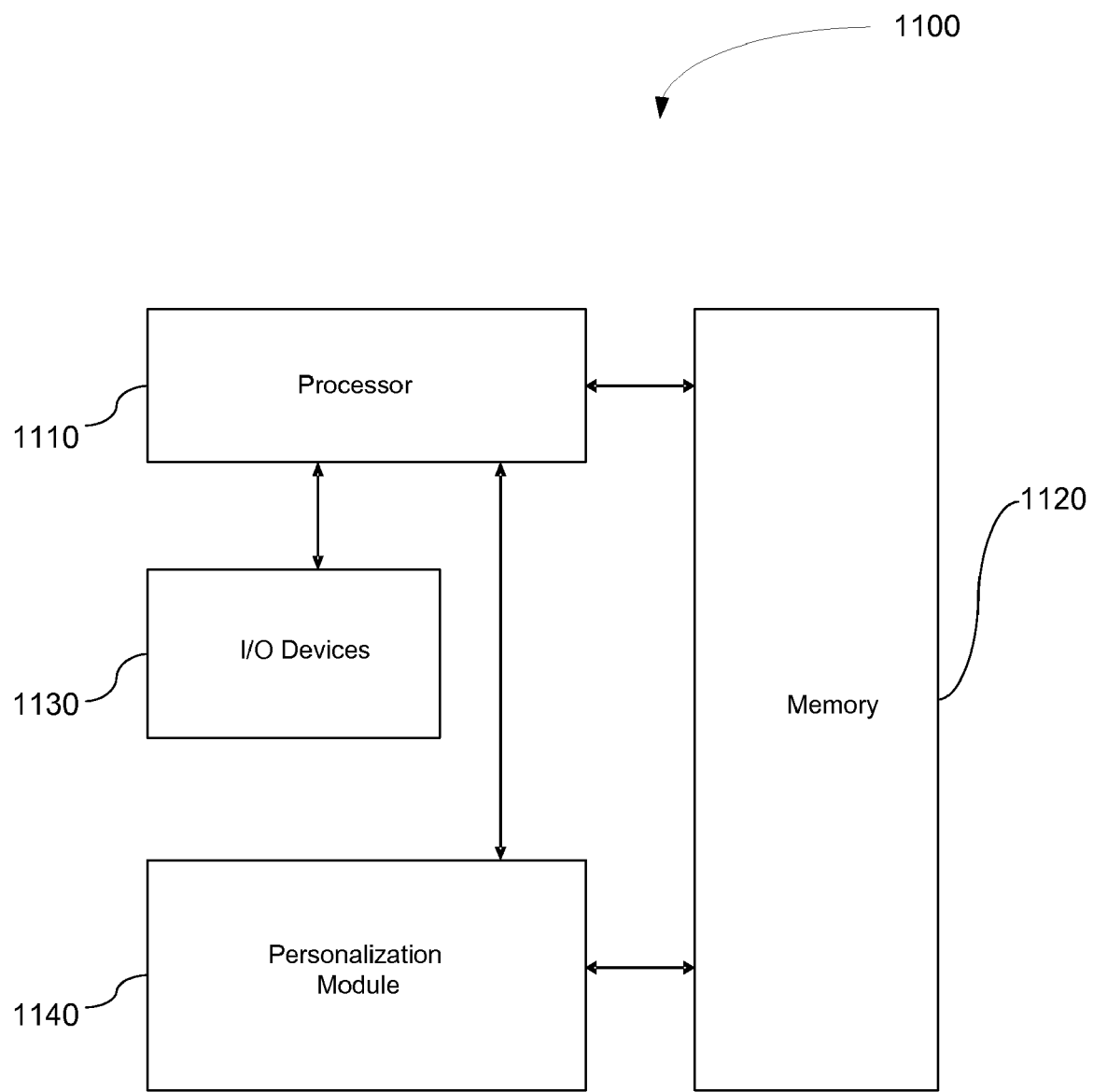
FIG. 11 illustrates a block diagram of a station or system that implements a dynamic and real-time configurable software architecture for manufacturing personalization.

FIG. 11 illustrates a block diagram of a station or system 1100 that implements a dynamic and real-time configurable software architecture for manufacturing personalization. In one embodiment, the station or system 1100 is implemented using a general purpose computer or any other hardware equivalents. Thus, the station or system 1100 comprises a processor 1110, a memory 1120, e.g., random access memory ("RAM") and/or read only memory (ROM), a personalization module 1140, and various input/output devices 1130, (e.g., storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)).

It should be understood that the personalization module 1140 may be implemented as one or more physical devices that are coupled to the processor 1110 through a communication channel. Alternatively, the personalization module 1140 may be represented by one or more software applications (or even a combination of software and hardware, e.g., using application specific integrated circuits (ASIC)), where the software is loaded from a storage medium, (e.g., a magnetic or optical drive or diskette) and operated by the processor in the memory 1120 of the computer. As such, the personalization module 1140 (including associated data structures) of the present disclosure may be stored on a computer readable medium, e.g., RAM memory, magnetic or optical drive or diskette and the like.

It is understood that the dynamic and real-time configurable software architecture for manufacturing personalization described herein may also be applied in other types of systems. Those skilled in the art will appreciate that the various adaptations and modifications of the embodiments of this method and apparatus may be configured without departing from the scope and spirit of the present method and system. Therefore, it is to be understood that, within the scope of the appended claims, the present method and apparatus may be practiced other than as specifically described herein.

We claim:

1. A method comprising:
   in a message controller, receiving a first personalization request to personalize a first communication device and a second personalization request to personalize a second communication device, the second communication device being distinct from the first communication device;
   in the message controller, composing a first message having personalization information specific to the first communication device and a second message having personalization information specific to the second communication device according to a set of rules having information indicating a distributed environment set of files for use in a distributed environment and a centralized environment set of files for use in a centralized environment, and configuring one or more communication parameters specific to the first communication device for the first message and one or more communication parameters specific to the second device for the second message with a message flow control engine according to the set of rules; and processing the message with a message handler according to a configuration of personalization software for the communication device, wherein the message handler sends the first message to the first communication device operably to a first station that has a first graphical user interface to specify a first message profile and the second message to the second communication device operably connected to a second station that has a second graphical user interface to specify a second message profile, the second graphical user interface distinct from the first graphical user interface.

2. The method of claim 1, wherein the one or more communication parameters includes a message path.

3. The method of claim 1, wherein the one or more communication parameters includes a message transmission rate.

4. The method of claim 1, wherein the one or more communication parameters determines error message handling work flow.

5. The method of claim 1, wherein the one or more communication parameters includes a message processing time.

6. The method of claim 1, wherein the one or more communication parameters includes metadata that indicates a message protocol specific to a communication interface for a specific module in the communication device.

7. The method of claim 1, wherein the centralized environment includes a client mode and the configuration is a client mode.

8. The method of claim 7, wherein the message handler, based on the client mode, retrieves a client dynamically linked library file.

9. The method of claim 1, wherein the distributed environment includes a client mode or a server mode.

10. The method of claim 9, wherein the configuration is a server mode.

11. The method of claim 10, wherein the message handler, based on the server mode, retrieves a server dynamically linked library file.

12. The method of claim 1 wherein the message controller simultaneously in real-time composes the first message and the second message.

13. A method comprising:

in a message controller, receiving a first personalization request to personalize a first communication device and a second personalization request to personalize a second communication device, the second communication device being distinct from the first communication device;

in the message controller, composing a first message having personalization information specific to the first communication device and a second message having personalization information specific to the second communication device with a message composer engine according to a set of rules having information indicating a distributed environment set of files for use in a distributed environment and a centralized environment set of files for use in a centralized environment, and configuring one or more communication parameters specific to the first communication device for the first message and one or more communication parameters specific to the second device for the second message according to the set of rules; and processing the message with a message handler according to a configuration of personalization software for the communication device, wherein the message handler sends the first message to the first communication device operably to a first station that has a first graphical user interface to specify a first message profile and the second message to the second communication device operably connected to a second station that has a second graphical user interface to specify a second message profile, the second graphical user interface distinct from the first graphical user interface.

14. The method of claim 13 wherein the message controller simultaneously in real-time composes the first message and the second message.

* * * * *